No. 634,163. Patented Oct. 3, 1899.
J. W. & W. W. BRERETON.
DRIVING GEAR.
(Application filed Dec. 29, 1897.)

(No Model.) 3 Sheets—Sheet 3.

Witnesses:
J. M. Fowler Jr.
Thomas Durant

Inventors:
John W. Brereton and
William W. Brereton
by Church & Church
their Attorneys.

UNITED STATES PATENT OFFICE.

JOHN WESTROPP BRERETON, OF ATHLONE, AND WILLIAM WESTROPP BRERETON, OF GALWAY, IRELAND.

DRIVING-GEAR.

SPECIFICATION forming part of Letters Patent No. 634,163, dated October 3, 1899.

Application filed December 29, 1897. Serial No. 664,223. (No model.)

*To all whom it may concern:*

Be it known that we, JOHN WESTROPP BRERETON, residing at Ladywell, Athlone, and WILLIAM WESTROPP BRERETON, residing at Prospect Hill, Galway, Ireland, subjects of the Queen of Great Britain, have invented certain new and useful Driving-Gear, of which the following is a specification.

This invention relates to driving-gear for cycles or motor-driven vehicles and other machines. As it is particularly applicable to cycles we have hereinafter described it in that connection, and from this description its application to other machines will be sufficiently well understood to render unnecessary special description of these different applications.

The invention will be best understood by reference to the accompanying drawings, in which—

Figure 1:
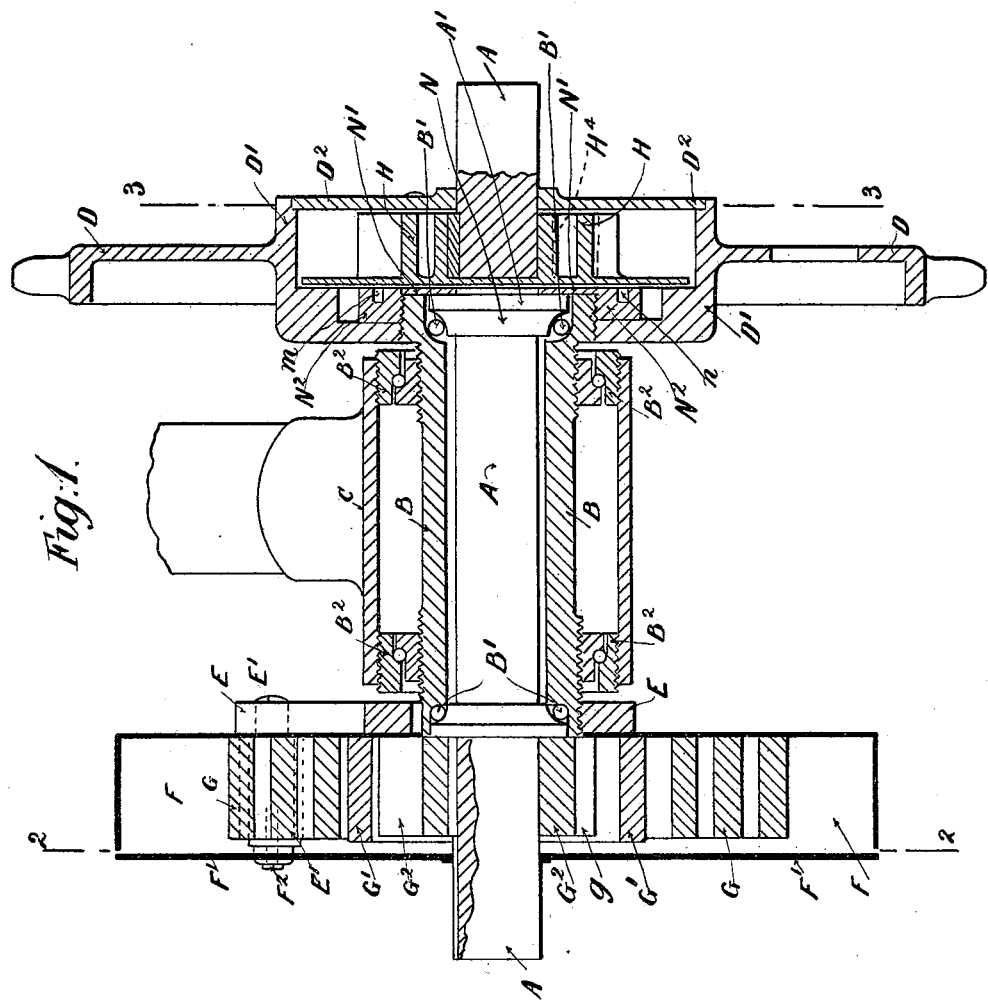
Figure 2:
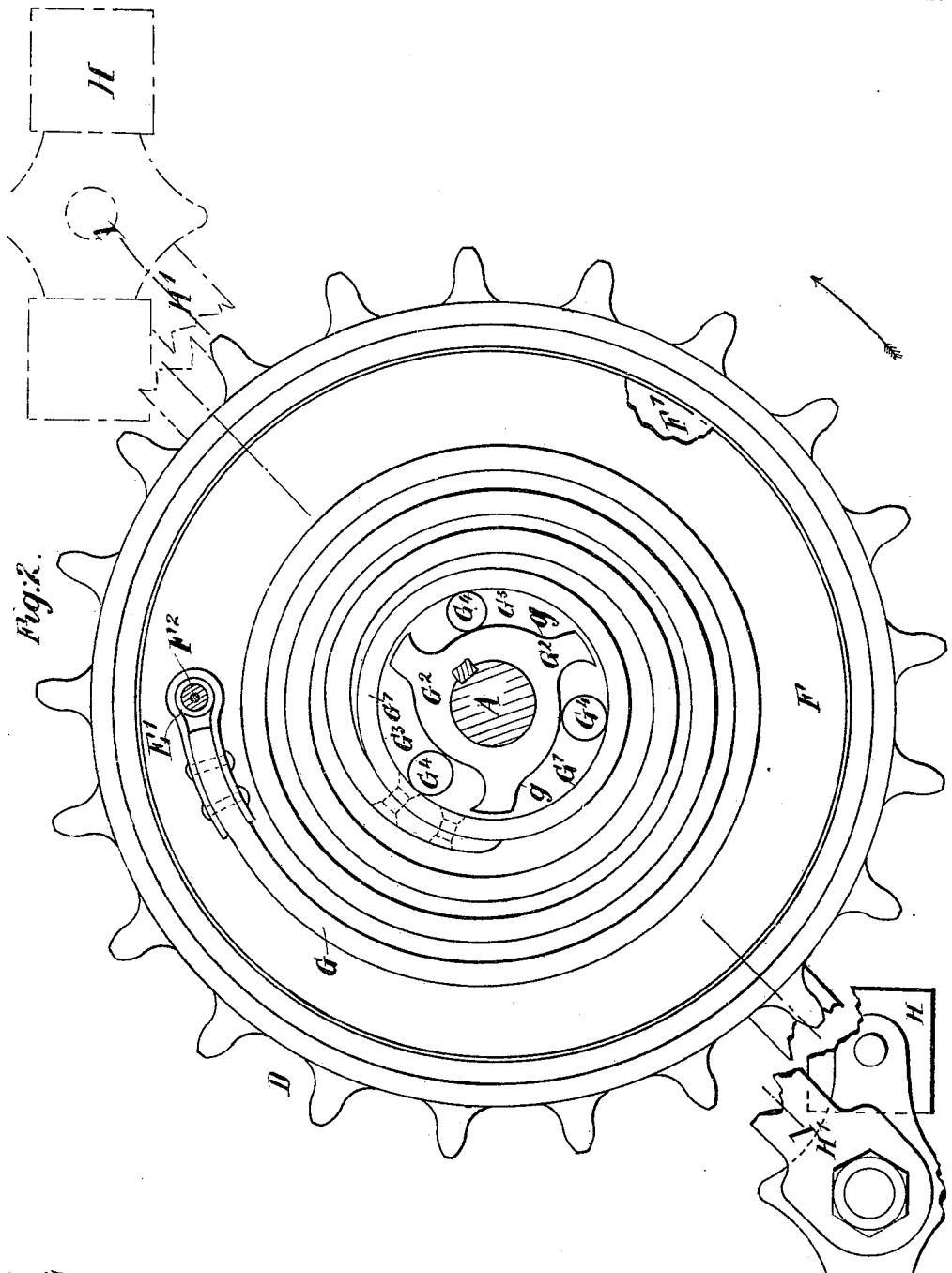
Figure 3:
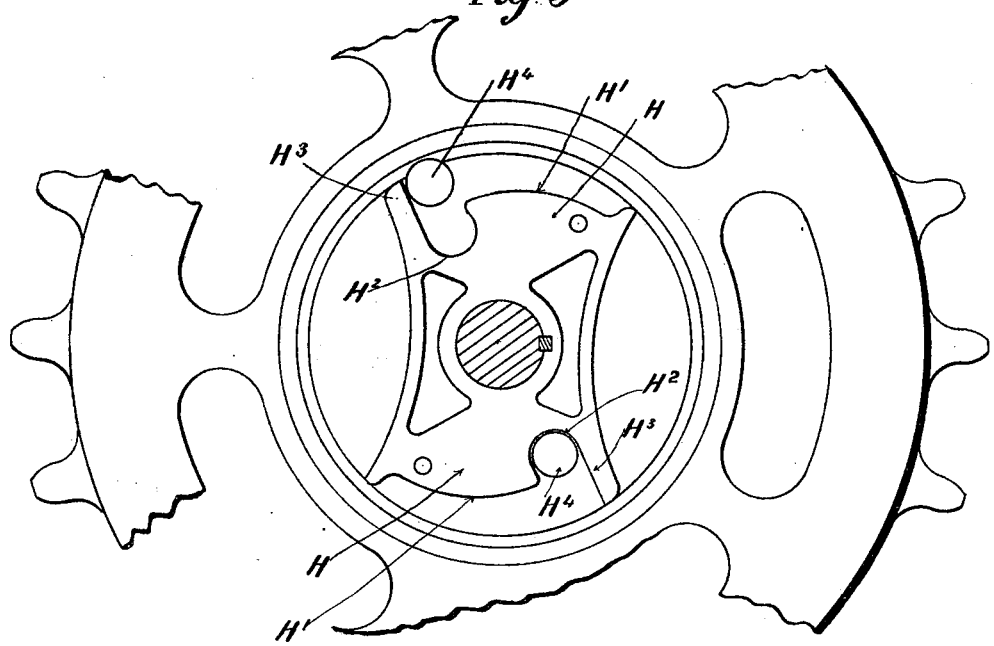
Figure 4:
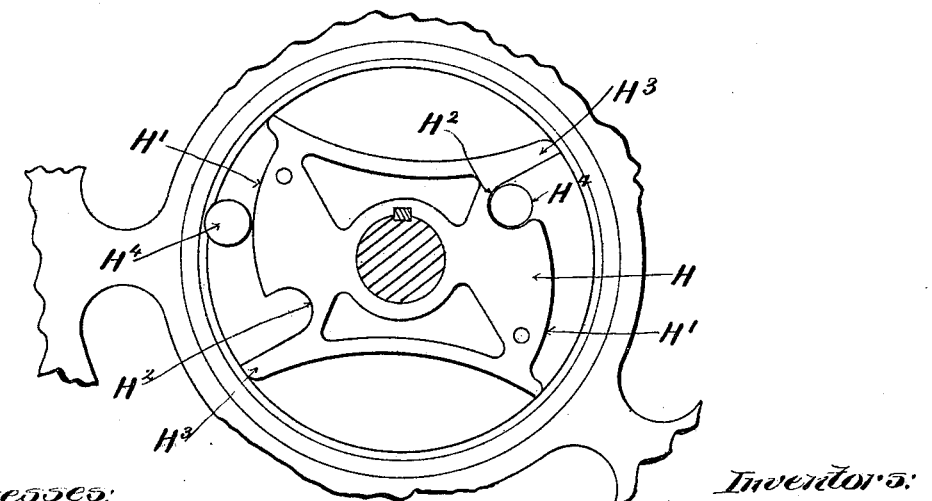

Figure 1 is a section on the line 1 1 of Figs. 2 and 3 of the bottom bracket of a cycle having our improved driving-gear fitted thereto. Figs. 2 and 3 are sections taken, respectively, on the lines 2 2 and 3 3 of Fig. 1; and Fig. 4 shows parts of the clutch shown in Fig. 3 in a different position.

Like letters indicate like parts throughout the drawings.

The crank-axle A is mounted in a sleeve B on ball or cone bearings B'. The sleeve itself is mounted on ball-bearings $B^2$ in the bottom bracket U of the cycle. On one end of the sleeve B is rigidly secured the chain-wheel D, formed with a central chamber or hollow boss D', and on the other side is fixed an arm E, through which is transmitted the power necessary for rotating the chain-wheel D. At or near the outer end of the arm E is fixed the stud or pin E', which projects into a circular drum or casing F, fixed to the said arm and containing a coil-spring G, of which the outer end is attached to the pin E and the inner end is secured to an inexpansible or rigid ring G'. This ring G' is not attached to any other part of the mechanism, although, as herein described, it becomes temporarily locked to the other parts by means of a clutch. Instead of providing a separate ring G' to which to secure the spring G, as just described, the spring itself may be arranged so that its inner turn constitutes the ring. This may be done by riveting or otherwise securing its inner end to the next adjacent convolution of the spring.

Within the ring G' we provide a disk $G^2$, rigidly secured to the crank-axle A and provided in its periphery with a series of recesses or pockets $G^3$, each receiving a roller $G^4$. Curved surfaces of the disk form the bottoms of the pockets $G^3$ and are not concentric with the crank-axle A. They thus constitute, in a manner well understood and well known, cams or gripping-surfaces, between which and the inner surface of the ring G' the rollers $G^4$ become jammed when the crank-axle A is rotated in the direction indicated by the arrow in Fig. 2—that is to say, the direction in which the axle A must be turned for propelling the cycle forward.

By the foregoing arrangement the cyclist rotates the sleeve B and the chain-wheel D through the spring G, which may consist of one or two coils only, and we are enabled to use a lower gear than would be otherwise desirable, which gives an advantage in mounting hills and when riding against the wind, while allowing as high a speed to be attained on the flat as if a higher gear were used.

To prevent backlash of the pedals and secure their being brought over past the dead-center at the end of each stroke and also to enable the cyclist to retard the progress of the cycle by back-pedalling, (which owing to the previously-explained action of the disk $G^2$ and rollers $G^4$ is not possible through the medium of the spring G,) we secure on the crank-axle A, within the hollow boss D', a cam H, free to rotate therein and having two similar eccentric surfaces H', diametrically opposite each other. At one end of each of these eccentric cam-surfaces H' is a pocket $H^2$ in the edge of the cam. Occurring between the surface H' and a projection $H^3$, also on the cam $H^4$, are two rollers which are carried around with the cam as it rotates in a manner which will hereinafter be more particularly described. The depth of the pocket $H^2$ below the lowest part of the surface H' must not be less than and should preferably exceed the semidiameter of the roller $H^4$. A flange $H^5$ is provided on the inner face of the cam H to prevent the rollers coming into contact with the side wall of the boss D'. This flange may be formed integral with or may be secured to the cam. The outer side of the hollow boss D' is closed by a disk or cover $D^2$, carried by the axle A or attached by screws to the cam H, as shown, and fitting loosely at its edge in a rabbet on the boss D'. In order that the cranks may be carried over the dead-centers by the clutch formed by the cam H, rollers $H^4$, and hollow boss D', the cam should be secured upon the axle A in such a position that one of the rollers $H^4$ is just about to fall out of its pocket when either of the cranks is just reaching its highest position and does fall out by the time that position is reached.

The operation of the gear is as follows: In forward driving the rotation imparted to the axle A from the pedals is transmitted through the disk $G^2$, spring G, and sleeve B to the chain-wheel D, the clutch formed by the disk $G^2$ and ring G' being operative owing to the rollers $G^4$ being engaged between the cam-surfaces of the disk and the ring. As the cam H rotates the rollers $H^4$ fall alternately into and out of the pockets $H^2$, provided that no relative motion between the cam H and boss D' equivalent to the overrunning of the former by the latter occurs at a time when either of the rollers is in a position to become jammed or engaged between a surface H' and the boss D'. Should a roller be so engaged intentionally or otherwise, it can be released by a forward thrust on the pedals sufficiently heavy to cause the cam H to overtake the boss D'.

Should the cyclist desire to stop pedaling for a short time, but continue to go forward by impetus, it is only necessary that both rollers should be free—that is, not engaged between the boss D' and one of the surfaces H'—then when the pedal-cranks are in an approximately horizontal position to hold them in that position and keep the feet on the pedals, using them as foot-rests, the clutch and its parts being in the position shown in Fig. 4. In like manner the pedals can be used as foot-rests while running down any hill, and while so doing there is little liability to skid, since the cyclist retains the natural position of the feet on the pedals, which position also allows the rider to immediately back-pedal should the pace become undesirably high by the failure of the break to act sufficiently or from any other cause. The range of positions in which the pedals can be thus used as foot-rests is substantially one-quarter of a revolution of the crank-axle, it being obviously limited to the angle within which neither roller $H^4$ can come into engagement. This will be the case so long as the uppermost roller is carried in its pocket and the point of the lower surface H' with which the lower roller comes into engagement has passed its lowest position sufficiently far to avoid the engagement of that roller.

When the cyclist desires to back-pedal, he may do so either by a short reverse motion of the pedals, which will cause the lower roller to jam and the pedals to be driven around in forward direction by the machine, or preferably by a forward motion of the pedals, which will cause the upper roller to fall by gravity out of its pocket and be engaged by its surface H'. When either or both the rollers is or are in engagement, any retardation of the revolution of the crank-axle is transmitted by the cam H and rollers $H^4$ to the boss D', and thus to driving-wheel, which mode of retardation of the machine through the pedals is known as "back-pedaling."

To prevent the oil from flowing from the ball-bearings B' into the hollow boss D', which might prevent the prompt engagement of the rollers $H^4$, we prefer to form an annular channel N between the cam H and the ball-cone A' adjacent to it and to provide a ring or collar N', being a flange upon another ring $N^2$, fitted in a recess in the hollow boss D' and provided with holes $b$ to enable it to be screwed into position by a suitable pin-spanner.

When the cyclist meets or runs over an obstacle, such as a stone or the like, the sudden resistance to rotation which would otherwise be presented to the pedals with consequent shock to the cyclist and strain to the cycle is absorbed by the spring. It is obvious that when the cyclist gives a heavy thrust on the pedal the work not used up to increase the speed of the cycle is stored in the spring and given out to increase the speed of the chain-wheel when the rider again presses the pedal forward with sufficient force to overcome the back pressure of the spring. Thus the chain-wheel D overruns the axle A for a portion of each stroke, causing the bicycle to travel at a higher speed than that represented by the number of revolutions of the pedals.

We claim—

1. In a driving-gear for cycles, the combination with the drive-axle, of a spring, a clutch interposed between the spring and axle, connection between the end of the spring and chain-wheel and a second clutch on the axle having grip-surfaces the reverse of those on the first clutch and having pockets for the grip-rollers.

2. In a cam and roller clutch having two rollers a cam such as H having two grip-surfaces H' the direction of said surfaces being reversed two projections $H^3$ and two pockets $H^2$ of such a depth and so disposed that both rollers are held out of engagement through a considerable angle of rotation of the cam substantially as described or illustrated in the accompanying drawings.

In testimony whereof we have hereto set our hands in the presence of the subscribing witnesses.

JOHN WESTROPP BRERETON.
WILLIAM WESTROPP BRERETON.

Witnesses to the signature of John Westropp Brereton:
ANDREW STITZEL,
JOHN LATCHFORD.

Witnesses to the signature of William Westropp Brereton:
BERNARD BRENNAN,
ROBERT JAMES HALLIDY.